US007032685B2

(12) United States Patent
Nakamizo

(10) Patent No.: US 7,032,685 B2
(45) Date of Patent: Apr. 25, 2006

(54) FASTENING TOOL

(75) Inventor: Seiichi Nakamizo, Miyaki-gun (JP)

(73) Assignee: Toku Pneumatic Tool MFG. Co., Ltd., Saga (JP)

( * ) Notice: Subject to any disclaimer, the term of this patent is extended or adjusted under 35 U.S.C. 154(b) by 0 days.

(21) Appl. No.: 10/902,368

(22) Filed: Jul. 29, 2004

(65) Prior Publication Data

US 2005/0023016 A1 Feb. 3, 2005

(30) Foreign Application Priority Data

Aug. 1, 2003 (JP) ............................ 2003-285044

(51) Int. Cl.
*B23B 23/14* (2006.01)
*B25D 15/00* (2006.01)

(52) U.S. Cl. .......................... 173/93.5; 173/93; 464/37

(58) Field of Classification Search .................. 173/93, 173/93.5, 93.6, 206, 176, 169; 464/37, 35, 464/17, 25

See application file for complete search history.

(56) References Cited

U.S. PATENT DOCUMENTS

| | | | | |
|---|---|---|---|---|
| 2,636,583 | A * | 4/1953 | Whitledge | 173/93.5 |
| 3,195,702 | A * | 7/1965 | Alexander | 173/176 |
| 3,292,391 | A * | 12/1966 | Kramer et al. | 464/25 |
| 4,557,337 | A * | 12/1985 | Shibata | 173/93.5 |
| 4,967,852 | A * | 11/1990 | Tatsuno | 173/93 |
| 5,092,410 | A * | 3/1992 | Wallace et al. | 173/93.5 |
| 5,217,079 | A * | 6/1993 | Kettner et al. | 173/177 |
| 5,544,710 | A * | 8/1996 | Groshans et al. | 173/176 |
| 5,704,434 | A | 1/1998 | Schoeps | |
| 5,775,999 | A * | 7/1998 | Hansson et al. | 464/25 |
| 6,179,063 | B1 * | 1/2001 | Borries et al. | 173/93.5 |
| 6,334,494 | B1 * | 1/2002 | Nagato | 173/93.5 |
| 6,666,283 | B1 * | 12/2003 | Frauhammer et al. | 173/93.5 |

FOREIGN PATENT DOCUMENTS

| | | |
|---|---|---|
| JP | 5-253857 | 10/1993 |
| JP | 9-174449 | 7/1997 |
| JP | 10-244472 | 9/1998 |

* cited by examiner

*Primary Examiner*—Scott A. Smith
(74) *Attorney, Agent, or Firm*—Jordan and Hamburg LLP

(57) ABSTRACT

Disclosed is a fastening tool equipped with a rotatively hitting mechanism comprising a cylinder disposed crossing a rotary axle of an anvil shaft at a right angle, a piston mounted slidably on and engaged with the cylinder, an oil passage communicating the inside of the cylinder with the outside of the anvil shaft, a rolling member disposed rolling along an inner wall surface of a rotating liner while being pressed with an elastic member, and a projection portion formed swelling inwardly on the inner wall surface of the rotating liner so as to hit the rolling member. The rotatively hitting mechanisms are disposed in plural numbers and at plural stages in a manner concentrically to each other, and the plural rotatively hitting mechanisms are disposed in a position relationship rotationally symmetrical to each other. An exhaust opening is disposed at a location nearby a body portion of the rotatively hitting mechanism.

16 Claims, 12 Drawing Sheets

FASTENING TOOL

FIELD OF THE INVENTION

The present invention relates to a fastening tool such as, for example, an oil pulse wrench or an impact wrench, and, more particularly, to a fastening tool for fastening or unfastening a bolt, a nut, etc, mounted on an anvil by instantaneously pressing or hitting with a pressing portion or a hitting portion that rotatively projects a portion to be pressed or a portion to be hit, securely supported to an anvil shaft.

RELATED ART

Recently, fastening tools have employed mainly a blade type as an oil pulse generating mechanism. The oil pulse generating mechanism of such a blade type can generate a torque in a manner that an oil closure is instantaneously formed once at every rotation of the liner of the fastening tool between an outer periphery of the anvil shaft and an inner peripheral surface of the rotating liner and one face of the liner is received by the blade face. As a peripheral enclosure surface member forming the oil closure, however, is made of a material less likely to be processed, the conventional mechanism suffers from many difficulties with a precision of oil closure, manufacturing costs, and so on.

In addition to the blade type as described above, there may also be used a piston type that can perform an oil closure at low costs. In association with fastening tools of the above type, the following techniques are known.

Japanese Patent Application Publication No. 253,857/1993 discloses an impact wrench in which a round inner peripheral surface of a cylinder-shaped rotary body coupled to a rotor axle of a motor is provided with a projection portion projecting inwardly from the inner peripheral surface thereof. Further, the tip portion of a hammer is engaged with the projection portion in such a manner that it can radially extend outwardly or contract inwardly from a base portion of the output shaft, and a spring is interposed between the base portion of the output shaft and a shoulder portion of the hammer. With this structure, the output shaft is rotated by striking the projection portion on the projected tip portion of the hammer.

The impact wrench as disclosed in Japanese Patent Application Publication No. 253,857/1993 recited above is provided with the structure in which the generally cylindrical liner connected directly to the rotor has the projection portion swelling toward the inside and the hammer striking the projection portion is pushed out in the opposite direction. This structure has the mechanism that can extend the hammer hitting the projection portion longitudinally in the central position and can play a role as a cam for pushing the hammer out in the forward and rearward directions. Therefore, this mechanism allows the hammer to hit the projection portion once at one rotation of the liner. The prior art impact wrench of this kind, however, presents the disadvantages that an accurate cam mechanism is required and the structure may become so complicated and the size may become so large that the effect expected to be gained by a couple of forces cannot be demonstrated to an adequate extent, in the case where plural hitting structures is combined for generating a couple of forces. The prior art impact wrench has further the problem that, as the hammering mechanisms are not disposed in a symmetrical way as well as the hammer made of a metal directly hits the liner made of a metal mechanically, a balance may become poor at the time of unloaded rotation or hammering and a vibration may become large. Moreover, the impact wrench of this type has the problem that a precision of torque may often vary at the time of fastening work because it is not of such an oil pulse type that can generate an oil pulse by filling the liner with oil and closing the oil therein.

Japanese Patent Application Publication No. 244,472/1998 discloses an impact wrench, in which the rotating hammer is provided with a sliding cam plane in a manner that the center of the sliding cam plane formed on the inner peripheral surface of the rotating hammer is eccentric from the rotary shaft core. As the tip cam of an anvil piece on the anvil mounted rotatively on the rotary shaft core in the rotating hammer approaches a groove through which the cam passes, while sliding on the sliding cam plane, an angle of inclination of the tip cam becomes larger increasing a width of impact between the anvil piece and the rotating hammer.

The impact wrench as disclosed in the above Japanese Patent Application Publication No. 244,472/1998 is of the type in which the hammered portion is allowed to move in the forward and rearward directions by the cam mechanism, so that an impact force is added directly to the cam member. Therefore, this prior art impact wrench have the drawbacks that a long-term durability and maintenance performance lack as well as devices constituting these members made of a high strength material may become complicated, thereby rendering the steps of processing parts and assembling them complex and lacking economy.

Japanese Patent Application Publication No. 174,449/1997 discloses a hydraulic torque wrench having a mechanism that one impact torque can be generated at every rotation of a liner. The hydraulic torque wrench is arranged such that the liner disposed so as to pivot by a rotor is provided with a liner chamber in the form of a cocoon and it is further provided with four seal planes in its inner peripheral surface. Out of the four seal planes, on the one hand, two seal planes are formed in a straight manner on a line on which the inner peripheral surface of the liner crosses the longitudinally extending axis line of the liner. On the other hand, the other two seal planes are formed in such a manner that the liner chamber is defined and delimited so as to make the volumes of two high pressure chambers equal to each other at the time when an impact torque is generated. Further, the other two seal planes are formed in a plane parallel to or perpendicular to the central axis of the liner and in a manner asymmetrically rotationally by 180° to each other. In addition, two blades are disposed on the main shaft so as to slidably abut with the two seal planes formed in the straight manner upon generation of an impact torque. With this structure, the two seal planes slidably abutting with the other two seal planes are formed in the outer peripheral surface of the main shaft at the time of generating an impact torque in such a manner that one impact torque can be generated at every rotation of the liner.

The oil pulse wrench as disclosed in Japanese Patent Application Publication No. 174,449/1997 has the structure in which the main shaft is provided with a pair of blades in a symmetrical way with respect to the rotary axle core and an impact torque is generated once at every rotation of the liner. This structure, however, requires fully sealing the entire planes of the cocoon-shaped oil chamber upon the formation of an oil closure chamber necessary at the time of generating the impact torque. Further, a high processing precision is required for sealing all the planes of the cocoon-shaped oil chamber enclosed with five planes being formed while all the planes are being slid. For the oil pulse wrench of this type, a pulse performance depends upon such a precision of the oil closure. Moreover, in order to generate an impact torque at every rotation of the liner and as a result improve a device performance, the prior art oil pulse wrench requires high precision processing techniques, for example, for forming the sealing projection portions of the main shaft in an asymmetrical relationship deviating from the axial line and at the same time forming the sealing projection portions on the inner peripheral surface of the line on the partner side in an asymmetrical relationship deviating therefrom in substantially the same manner as above. The preparation of such a cocoon-shaped oil chamber, however, is rendered high in costs of manufacturing and maintenance.

U.S. Pat. No. 5,704,434 to Schoeps discloses a hydraulic torque impulse mechanism in which projection portions are formed in the inner periphery of a liner at two locations in such a manner as facing each other and two pistons are disposed facing each other in the direction perpendicular to the axial center of an anvil shaft. Further, rollers are disposed surrounding the pistons so as to roll along the inner wall surface of the liner while staying in contact with the inner wall surface thereof. In addition, a cam in a generally oval form which extends each piston toward the inner wall surface of the liner is disposed in the anvil shaft central portion of the piston so as to rotate simultaneously with the liner. With this structure, the prior art hydraulic torque impulse mechanism can generate an oil impulse by means of a check valve that can close oil once at every one rotation of the liner operatively coupled to the movement of the cam.

The hydraulic torque impulse mechanism as disclosed in U.S. Pat. No. 5,704,434 to Schoeps has the structure in such a manner that a pair of the pistons and the rollers are coupled to the rotor shaft of the rotary cylindrical member in a manner as facing each other on the identical section in the direction perpendicular to the axial center of the output shaft and the anvil shaft and that a rotating torque can be generated by a couple of forces by means of a pair of projection portions disposed facing each other on the identical section, the projection portion being formed as swelling inwardly from the inner periphery of the rotary cylindrical member.

If the couple of torque forces would be generated at each of half rotations, a force of impact may lack for the prior art hydraulic torque impulse mechanism due to entering a compression stroke without obtaining an adequate rotating speed at the time of hammering. Therefore, a means for preventing an occurrence of a lack of an impact force is required. In other words, this mechanism is provided with a cam with a check valve structure that closes compression oil within the piston only once at every one rotation in synchronism with the time of hammering. The prior art mechanism has the problem, accordingly, that the area of the oil closure chamber becomes extremely narrow so that oil may deteriorate at very early timing and early maintenance may be needed. Moreover, a pair of pistons in this check valve mechanism requires one more useless reciprocal movement at every rotation from the structural point of view.

Furthermore, the addition of the check valve structure cannot afford to mount a relief valve for adjusting an oil vessel. In addition, the prior art hydraulic torque impulse mechanism has the drawback that the structure for the fastening tool is rendered complicated in the case where it is applied to a product with a shut-off mechanism, because it is impossible to take a torque generating signal from the high pressure oil generating only in the central portion.

BRIEF DESCRIPTION OF THE ACCOMPANYING DRAWINGS

SUMMARY OF THE INVENTION

Figure 1:
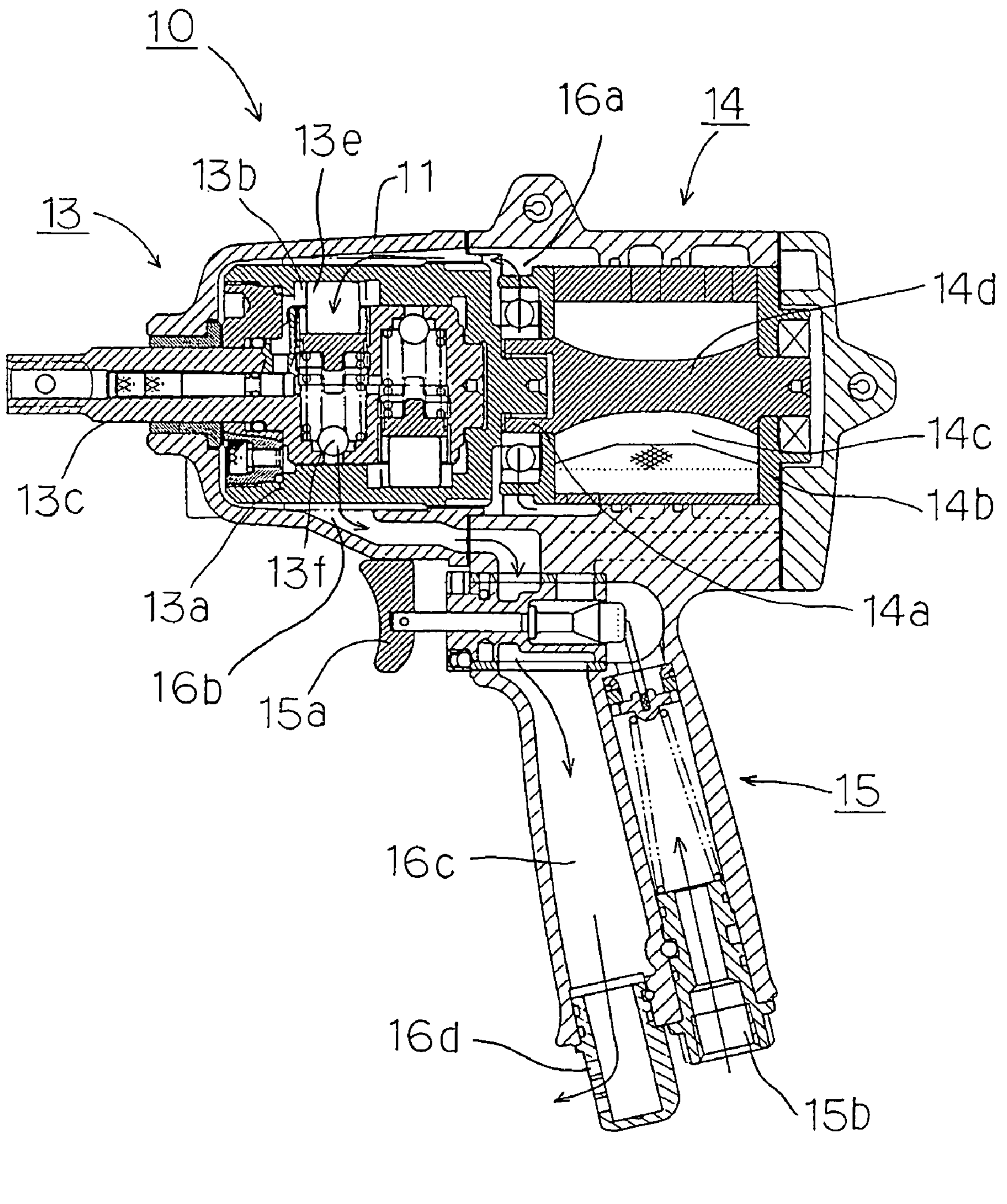
FIG. 1 is an elevation in section showing a fastening tool according to Example 1 of the present invention.

As a result of extensive studies to solve the problems prevailing in the conventional fastening tool technology, it has been found that a fastening tool can be provided, which can effectively transmit to an anvil a torque generated by an oil pulse, etc. by supporting a portion to be hit at the point at which the rotatively hitting portion presses or hits a portion to be hit, and which has a good long-term lubrication performance and durability as well as a good maintenance performance and economy.

The present invention, therefore, has an object to provide a fastening tool which has the structure as briefly described above and has a good long-term lubrication performance and durability as well as a good maintenance performance and economy.

In order to achieve the object, the present invention provides a fastening tool which comprises a generally cylinder-shaped liner with its inside filled with oil, connected rotatively to a drive mechanism, such as a pneumatic motor or an electrically driven motor; an anvil shaft disposed inside the liner rotatively and coaxially with the liner; a cylinder mounted on the anvil shaft in a direction crossing a rotary axle of the anvil shaft; a piston slidably engaged with and mounted on the cylinder; an oil passage communicating the inside of the cylinder with the outside of the anvil shaft; a rolling member in a roller-shaped form or a ball-shaped form, held at a top of the piston and disposed so as to roll along an inner wall surface of the liner while pressing onto the inner wall surface of the liner with an elastic means; and a projection portion disposed swelling on the inner wall surface of the liner so as to hit the rolling member.

In a preferred embodiment, the present invention provides the fastening tool having the above structure configuration, in which the oil passage is provided with a check valve for introducing oil filled in the liner into the cylinder engaged with a base of the piston.

In another preferred embodiment, the present invention provides the fastening tool having the above structure configuration, in which a plurality of the rotatively hitting mechanisms is disposed at plural stages coaxially with each other and a pair of the projection portions, the pistons, and the rotatively hitting mechanisms are arranged in a relationship rotationally symmetrical to each other.

The present invention provides, as a further embodiment, the fastening tool having the above structure configuration, in which the liner is rotated with the drive mechanism equipped with the pneumatic motor, the air driving the pneumatic motor is supplied to an exhaust passage disposed in the rotatively hitting mechanism to cool the rotatively hitting mechanism.

The present invention provides, as a further embodiment, the fastening tool having the above structure configuration, in which the drive mechanism is provided with the pneumatic motor equipped with a shut-off mechanism for blocking a supply of high pressure air, and the shut-off mechanism comprises a pressure decreasing unit for adjusting a hydraulic pressure in the liner to a predetermined value, a rod portion disposed so as to be driven axially by a hydraulic pressure of oil passed through the pressure decreasing unit, and a shut-off valve arranged for opening or closing in association with the rod portion.

In a still further embodiment, the present invention provides the fastening tool having the above structure configuration, which is further composed of an air passage switching valve disposed in an air passage to supply high pressure air to the pneumatic motor, for switching a torque control passage for supplying high pressure air to the pneumatic motor via the shut-off mechanism and a non-torque control passage for supplying the high pressure air to the pneumatic motor by bypassing the shut-off mechanism.

BEST MODES FOR CARRYING OUT THE INVENTION

The fastening tool according to an embodiment of the present invention is provided with a rotatively hitting mechanism that is composed of the liner in a generally cylindrical shape, which is rotatively coupled to a drive mechanism, including to but being not limited to a pneumatic motor, an electrically driven motor, etc., and whose inside is to be filled with oil. Inside the liner is disposed an anvil shaft in a manner rotatively and coaxially with the liner, and a cylinder is disposed on the anvil shaft in a way crossing at a right angle the rotary axis of the anvil shaft. A piston is engaged with and mounted slidably on the cylinder, and the inside of the cylinder is disposed so as to communicate with the outside of the anvil shaft through an oil passage. The piston is further disposed with a rolling member in the form of a roller, a ball, or the like, held at the tip portion thereof so as to move rotatively while being pressed onto the inner peripheral surface of the liner by the aid of an elastic means. The rotating liner is provided with a projection portion swelling on the inner peripheral surface so as to hit the rolling member. This structure allows oil filled in the liner to flow into the cylinder holding the piston through the oil passage, so that an impact torque can be transmitted in a smooth fashion upon pressing or hitting the projection portion (the hitting portion) with the rolling member (the portion to be hit). Therefore, the rotatively hitting mechanism (an oil pulse generating mechanism) for use with the present invention can be comprised by a simple structure, which can generate an oil pulse and so on as well as which is high in transmitting the impact torque, upon pressing or hitting the projection portion (the hitting portion) onto the rolling member (the portion to be hit), and lubricating performance between parts, and low in generating noises. Thus, the present invention provides the fastening tool that is superior in durability during a long term, maintenance performance, and economy.

The fastening tool according to another embodiment of the present invention may have the structure in which the oil passage is provided with a check valve for introducing oil filled in the liner into the cylinder with the base portion of the piston engaged therewith. More specifically, this structure allows the rolling member to be pressed effectively on the projection portion in such a manner that oil inside the cylinder with the piston engaged therewith is held in a closed state by the check valve and the entry of the rolling member and the piston is blocked at the time when the projection portion swollen on the inside of the inner wall surface of the liner is pressed or hit onto the rolling member held with the piston. Further, after the rolling member rolls over the projection portion of the liner and rotates, the oil outside the outer periphery of the anvil shaft is fed to the inside of the cylinder through the check valve to rotate the rolling member in such a state that the tip portion of the rolling member is extended. With this structure, the rolling member working as the portion to be hit or pressed can be supported with certainty at the time when the rolling member presses or hits the projection portion to thereby transmit the impact force to the anvil in an effective fashion.

In accordance with a further embodiment of the present invention, there is provided the fastening tool in which the rotatively hitting mechanisms are concentrically coupled to each other at plural stages and a pair of each of the projection portions of the liner, the pistons and the rolling members is disposed in a rotationally symmetrical relationship. This structure allows a plurality of the rotatively hitting mechanisms to be disposed in a rotationally symmetrical relationship, a moment of a couple of forces to be added to the rotary shaft of the anvil, and realize a one impact at every one rotation without a complicated structure such as a cam mechanism. Therefore, the fastening tool according to the present invention can improve a hitting efficiency for the fastening tool and make the fastening tool compact in size as well as maintain a stably hitting state by minimizing a vibration, noises, etc., caused by the rotating portions The fastening tool according to a further embodiment of the present invention may be arranged in such a manner that the liner is rotated by the drive mechanism equipped with the pneumatic motor. For the fastening tool of this type, the rotatively hitting mechanism may be preferably disposed such that the air that has driven the pneumatic motor is fed to an exhaust passage formed in the rotatively hitting mechanism in order to cool the rotatively hitting mechanism. This structure can effectively cool the rotatively hitting mechanism by exposing a total flow amount of the exhaust air directly to the body portion of the liner or the like of the rotatively hitting mechanism.

The fastening tool according to a still further embodiment of the present invention may be provided with a shut-off mechanism for blocking a supply of high pressure air for driving the pneumatic motor in accordance with the hydraulic pressure within the liner. This shut-off mechanism can prevent an excessive load of impact forces to the liner during operations for fastening bolts, nuts, etc. to be mounted on the anvil, thereby improving performance for operations of assembling and disassembling the parts as well as durability of the structuring members. This shut-off mechanism can also control a useless consumption of high pressure air. The adjustable disposition of an elastic member in the rod portion of the shut-off mechanism or the like can add a predetermined pressing force. This disposition allows a threshold value for opening a valve part disposed in a pressure-decreasing unit of the shut-off mechanism to be readily adjusted or set or otherwise disposed of through the rod portion. Further, this can make the apparatus composition so compact that the fastening tool is superior in costs for manufacturing and maintenance.

For the fastening tool according to a still further embodiment of the present invention, the high pressure air passage for supplying the pneumatic motor with the high pressure air for driving the pneumatic motor may be provided with an air passage switching valve for switching a torque control passage and a non-torque control passage. Therefore, the fastening tool of this kind can be handled with effectiveness and readiness in such a state in which the shut-off mechanism is rendered void in the case where bolts, nuts, etc. are fastened with a relatively small torque that does not specifically require the shut-off mechanism.

EXAMPLE 1

The following will be a specific description of the fastening tool according to each embodiment of the present invention.

Figure 2:
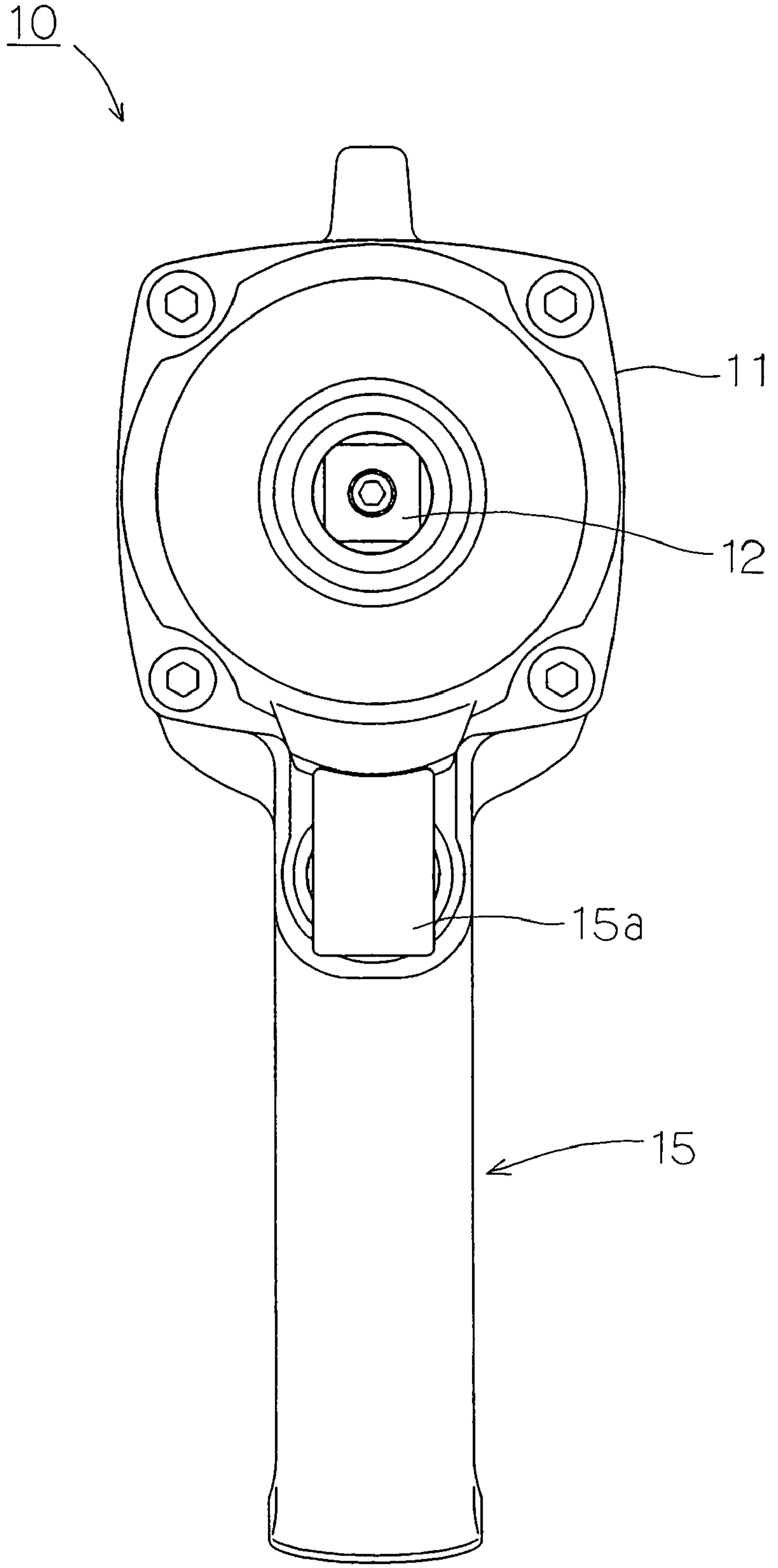
FIG. 2 is a side view in section showing the fastening tool of FIG. 1.
Figure 3:
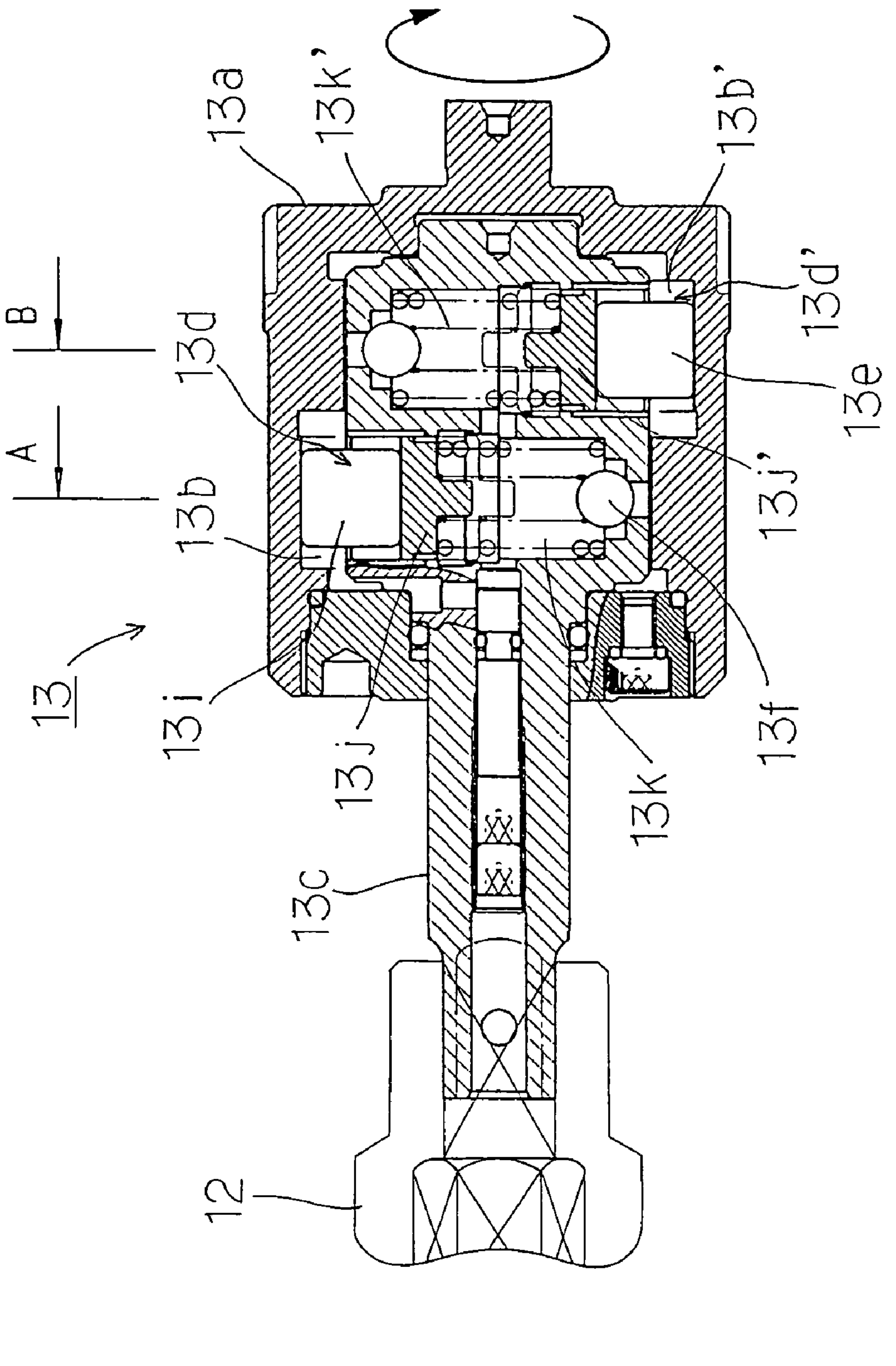
FIG. 3 is an elevation in section showing a rotatively hitting mechanism of the fastening tool of FIG. 1.
Figure 4:
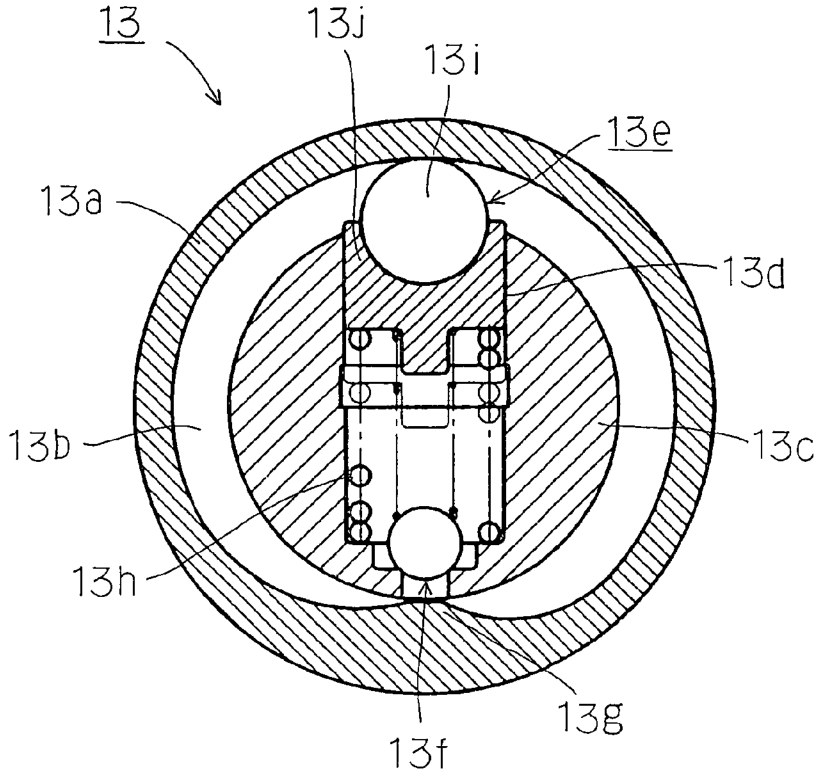
FIG. 4 is a side view showing the rotatively hitting mechanism of FIG. 3, in which (a) is a side view when taken along line as indicated by the arrow A and (b) is a side view when taken along line as indicated by the arrow B.
Figure 4:
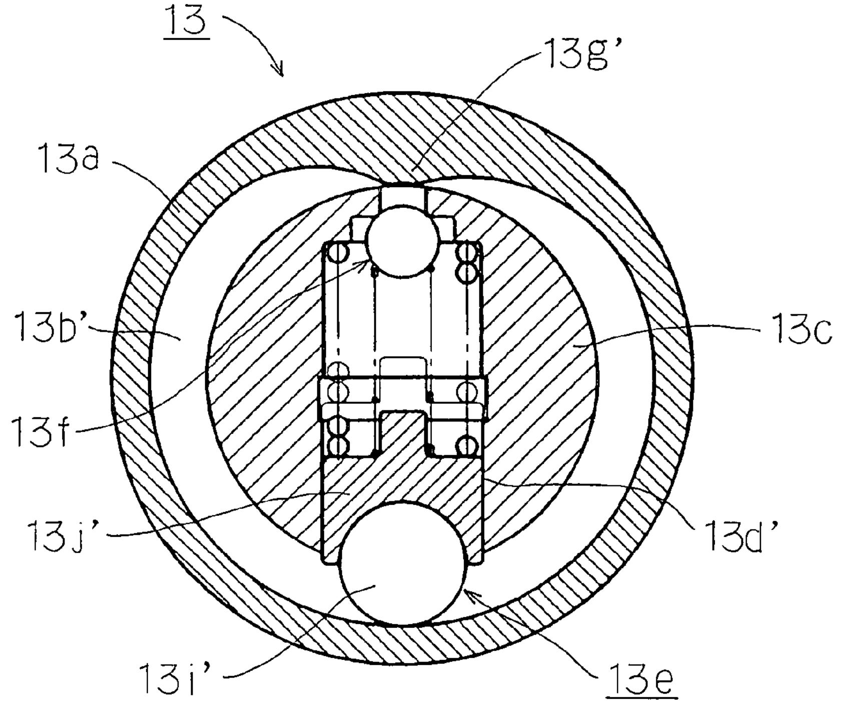

FIG. 1 is an elevation in section showing an oil pulse wrench as the fastening tool according to Example 1 of the present invention. FIG. 2 is a side view showing the oil pulse wrench of FIG. 1. FIG. 3 is an elevation in section showing the rotatively hitting mechanism of the oil pulse wrench of FIG. 1. FIGS. 4(*a*) and 4(*b*) are views in section showing the rotatively hitting mechanism of FIG. 3, when taken along line indicated by arrows A and B, respectively.

As shown in FIGS. 1 and 2, reference numeral 10 refers to the oil pulse wrench as an example of the fastening tool of Example 1 according to the present invention; reference numeral 11 refers to a main body casing for the oil pulse wrench 10; reference numeral 12 refers to a socket with which a bolt, a nut, etc. is engaged and to which it is mounted; reference numeral 13 refers to a rotatively hitting mechanism of the oil pulse wrench 10 for rotatably driving the socket 12 while providing an impact force through an anvil shaft 13*c* coupled to the socket 12; reference numeral 14 refers to a pneumatic motor for providing the rotatively hitting mechanism 13 with a rotatively driving force; and reference numeral 15 refers to a grip portion of the oil pulse wrench 10 as well as to an air supply portion for supplying a compressed air to the pneumatic motor 14.

As shown in FIGS. 3 and 4, the rotatively hitting mechanism 13 is composed of a liner 13*a*, the anvil shaft 13*c*, cylinders 13*d* and 13*d*', check valves 13*f* and 13*f*, rollers 13*i* and 13*i*' as an example of the rolling members, and pistons 13*j* and 13*j*'. The liner 13*a* is in a generally cylindrical shape and is rotatively connected to a drive shaft 14*a* of the pneumatic motor 14. The liner 13*a* is further provided with oil chambers 13*b* and 13*b*' at the front and rear parts thereof, respectively. The anvil shaft 13*c* is rotatively disposed in the oil chambers 13*b* and 13*b*'and the cylinders 13*d* and 13*d*' are formed in the anvil shaft 13*c*, respectively. The pistons 13*j* and 13*j*' are slidably mounted on the cylinders 13*d* and 13*d*', respectively, with the body parts engaged therewith, in the direction perpendicular to a rotary axle of the anvil shaft 13*c*. The rollers 13*i* and 13*i*' are held with the pistons 13*j* and 13*j*', respectively, so as to roll in the liner 13*a* while their tips are pressing the inner peripheral surface of the liner 13*a* by the aid of a coiled spring 13*h* or the like disposed therein. Oil chambers 13*k* and 13*k*" are provided under the pistons 13*j* and 13*j*' disposed in the cylinders 13*d* and 13*d*' so as to communicate with the oil chambers 13*b* and 13*b*', respectively, through a communication oil passage that in turn is provided with the ball-shaped check valves 13*f* and 13*f*, respectively.

A roller-pressed part 13*e* onto which the rollers 13*i* and 13*i*' are to be pressed is comprised of the pistons 13*j* and 13*j*' holding the rollers 13*i* and 13*i*', respectively.

On the inner wall surface of the liner 13*a*, there is provided with a pair of projection portions 13*g* and 13*g*', each swelling or protruding in a mountain-like shape at the front and rear portions thereof. This structure allows the rollers 13*i* and 13*i*' of the roller-pressed part 13*e* to press onto the projection portions 13*g* and 13*g*', respectively, thereby transmitting the reaction force to the pistons 13*j* and 13*j*' toward the axial center of the anvil shaft 13*c* and raising the closed pressure in the oil chambers 13*k* and 13*k*', respectively, to produce an oil pulse and add the hitting force to the anvil shaft 13*c*. By forming the rollers as projecting or swelling in an acutely angular state in the way as described above, the hitting force can be generated in substantially the same manner as an impact wrench that does not use a hydraulic pressure as hitting the inner peripheral surface of the liner at a right angle in a circumferential direction.

More specifically, the oil chamber 13*b*, the cylinder 13*d* and the piston 13*g*, disposed on the front side of the liner 13*a*, are arranged concentrically with the oil chamber 13*b*', the cylinder 13*d*' and the piston 13*g*', disposed on the rear side thereof, with respect to the rotary axle, and the former is integrated to the latter in a relationship symmetrical rotationally by 180° to each other.

The rollers 13*i* and 13*i*' held by the respective pistons 13*j* and 13*j*' are disposed so as to be slidable reciprocally in forward and rearward directions. Each of the rollers 13*i* and 13*i*' has a round section as a whole, which comes into abutment with the inner wall surface of the liner 13*a*. The rollers 13*i* and 13*i*' are rotatively supported with the pistons 13*j* and 13*j*', respectively, and the tips are biased so as to extend from the respective cylinders 13*d* and 13*d*' through the elastic member such as the coiled spring 13*h* or the like.

As described above, the check valve 13*f* is disposed in the oil passage communicating the oil chambers 13*b* on the base side of the cylinder 13*d* with the oil chamber 13*b*' on the base side of the cylinder 13*d*'. The check valve 13*f* can suppress the rollers 13*i* and 13*i*' from moving or entering into the pistons 13*d* and 13*d*' integrally disposed with the pistons 13*j* and 13*j*', respectively, by the aid of the oil filled therein. Further, the check valve 13*f* can extend and recover the rollers 13*i* and 13*i*' by pulling and extending the rollers 13*i* and 13*i*' which have once moved in or entered, together with the pistons 13*d* and 13*d*', respectively, by means of the elastic member, by taking the oil in the oil chambers 13*b* and 13*b*' into the oil chambers 13*k* and 13*k*', respectively, through the check valve 13*f*.

Figure 5:
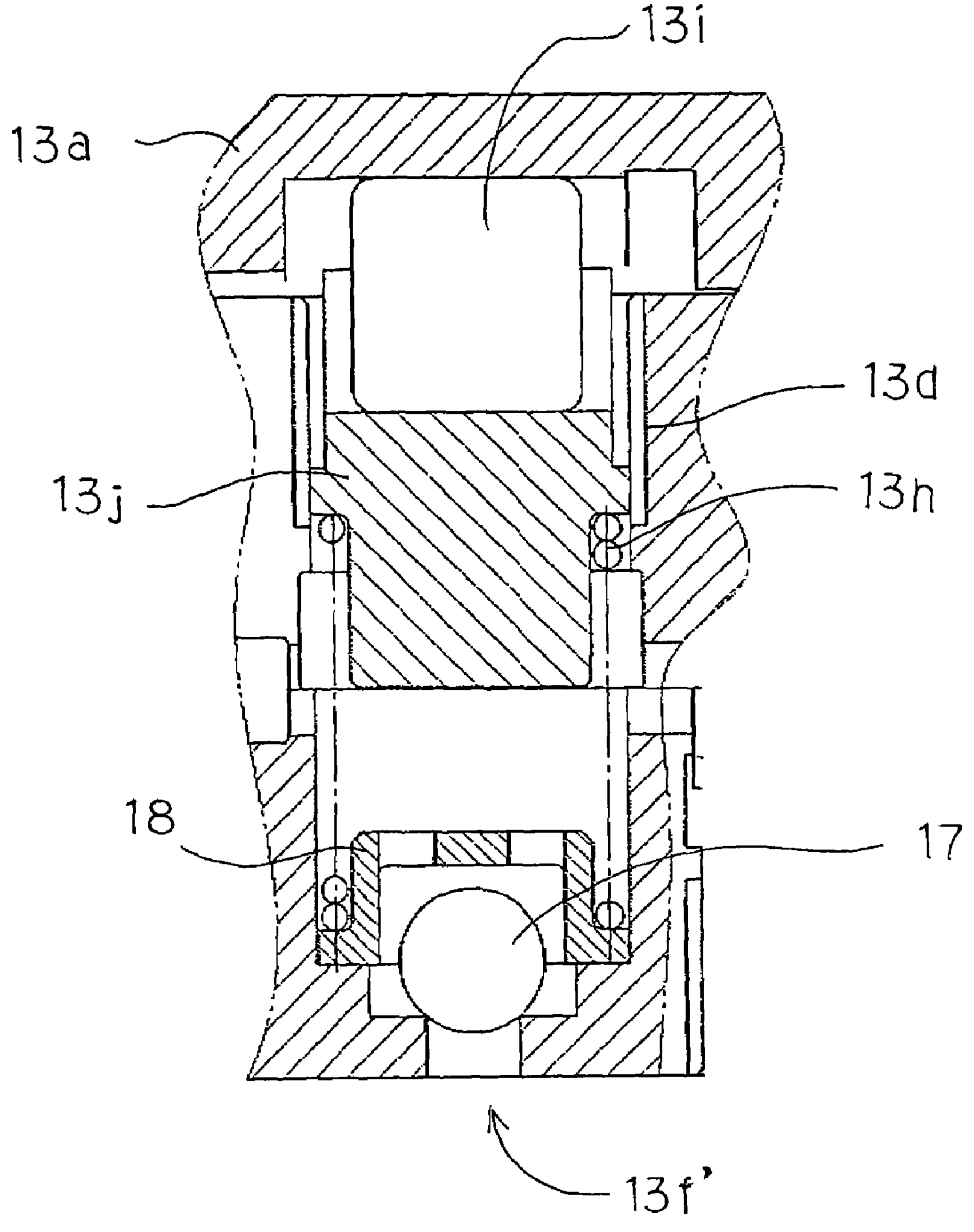
FIG. 5 is a side view showing a variant of a check valve.

FIG. 5 is a view in section showing a variant corresponding to the check valve 13*f*. As shown in FIG. 5, the oil passage communicating the oil chamber 13*b* on the base side of the cylinder 13*d* with the oil chamber 13*b*' on the base side of the cylinder 13*d*' is provided with a check valve 13*f* equipped with a cap portion 18 holding a ball-shaped valve member 17 inside so as to move up and down in a predetermined distance. The check valve 13*f* can suppress the rollers 13*i* and 13*i*' from moving or entering into the cylinders 13*d* and 13*d*', respectively, without using any biasing means such as a spring. At the same time, the check valve 13*f* can recover the rollers 13*i* and 13*i*' from the cylinders 13*d* and 13*d*', respectively, by extending the rollers 13*i* and 13*i*' therefrom by the aid of the oil incorporated into the respective oil chambers 13*b* and 13*b*'. This example where the check valve 13*f* of the variant is used is particularly preferred because it uses no part such as a spring, etc. that may deteriorate as a result of repetitive uses.

The pneumatic motor 14 working as the drive mechanism may be any air motor known to the art, but may include, but not be limited to, for example, an electrically driven motor that can be driven, for example, by a battery built in the main body casing 11 or an outside electric source, etc. In this example, an air motor is used which has a rotor support part 14*b* built in the main body casing 11 and a rotor part 14*d* built in the rotor support part 14*b*, having an air chamber 14*c* eccentric with respect to the axial center thereof. The air chamber 14*c* may be provided with a normal rotary flow passage or a reverse rotary flow passage, communicating with an air supply part 15. The operations of an air supply lever 15*a* of the air supply part 15 or a flow passage changeover lever, although not shown, can blow compressed air from a discharge bore communicating the normal rotary flow passage with the reverse rotary flow passage, disposed in the inner peripheral wall surfaces of the rotor support part 14*b*, thereby rotating the rotor part 14*d* of the pneumatic motor 14 in either normal or reverse direction. The rotor part 14*d* is connected to the liner 13*a* of the rotatively hitting mechanism 13 to thereby transmit the power of the pneumatic motor 14.

The air supply part 15 is provided with an air hose connection portion 15*b* through which an air hose is connected to a compressor or an air tank, although not shown, and compressed air having a given pressure is fed. The air supply part 15 can also serve as a gripping portion for the oil pulse wrench 10 so that it may be shaped in a handle-like form. The operations of the air supply lever 15*a* by the finger can supply compressed air at a predetermined flow rate.

As also shown in FIG. 1, the air discharged from the pneumatic motor is fed to an exhaust opening 16*b* through an exhaust passage 16*a*. The air is discharged outside from an air discharge portion 16*d* through the exhaust passage 16*c* after cooling the rotatively hitting mechanism 13 connected to the exhaust opening 16*b*. The total flow amount of the air discharged from the pneumatic motor in the manner as described above can work as cooling the heat-generating body part of the rotatively hitting mechanism 13 because the fastening tool does not have any passage communicating with the exhaust passage 16*c* other than the exhaust opening 16*b*.

Then, a description will be given regarding the rotatively hitting mechanism of the oil pulse wrench 10 according to Example 1 having the composition configuration as described above, with reference to FIG. 6 showing an illustration of operations. It is to be noted herein that the following description is directed to the rotatively hitting mechanism at the front side as shown in FIG. 4(*a*), but substantially the same description can be applied to the rotatively hitting mechanism at the rear side as shown in FIG. 4(*b*), which is symmetrical by 180° with respect to the rotatively hitting mechanism of FIG. 4(*a*).

Figure 6:
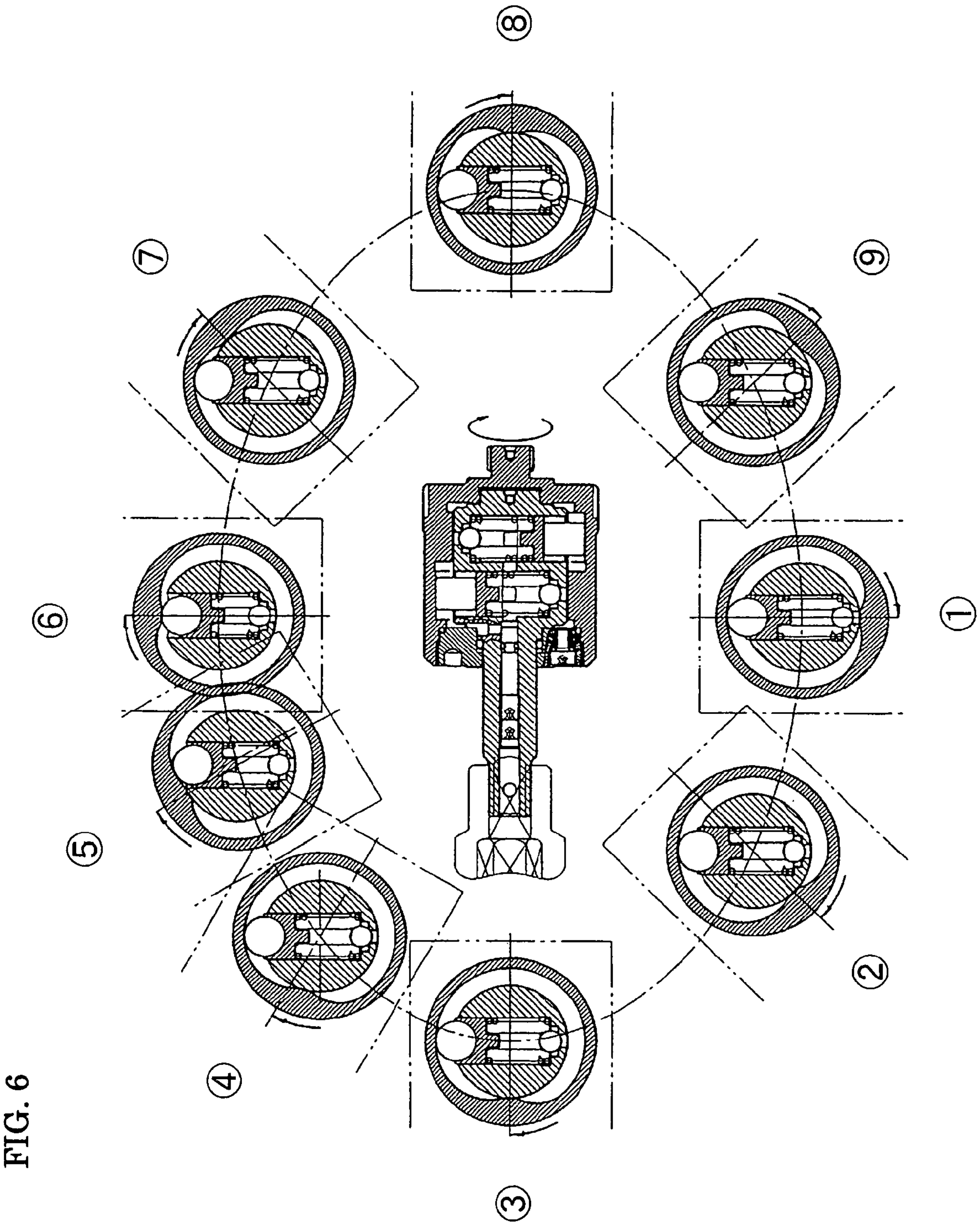
FIG. 6 is a view explaining operations of the rotatively hitting mechanism.

First, FIG. 6 (1) indicates the start state in which each of the cylinders 13*d* and 13*d*' of the anvil shaft 13*c* starts from the position farthest from the respective projection portions 13*g* and 13*g*' of the liner 13*a*. In this state, the pneumatic motor 14 is operated by compressed air to be fed from the air supply part 15, and the liner 13*a* is rotated in a clockwise fashion as specifically shown through the positions (2) and (3) to the position (4) in FIG. 6. At this time, the tip of each of the rollers 13*i* and 13*i*' is biased with the coiled spring 13*h* so as to protrude from the cylinders 13*d* and 13*d*', respectively, and started rolling along the liner 13*a* at a high acceleration rate while keeping in contact with the inner peripheral surface of the liner 13*a* without undergoing resistance.

As the tip of each of the rollers 13*i* and 13*i*' projected reaches the position (5) at which it comes into abutment with the respective projection portions 13*g* and 13*g*', the force acts in the direction in which the rollers 13*i* and 13*i*' are pushed into the cylinders 13*d* and 13*d*', respectively. At this time, however, the oil chambers 13*k* and 13*k*'' of the lower cylinders 13*d* and 13*d*', respectively, are filled with oil and held in a fixed state in which they are closed by the check valve 13*f*. And the rollers 13*i* and 13*i*' come into collision with the projection portions 13*g* and 13*g*' and roll over the projection portions 13*g* and 13*g*', respectively, thereby effectively generating a pressure in the oil inside the oil chambers which varies in a pulse-shaped way.

As indicated in the positions (6) and (7) in FIG. 6, when the oil inside the oil chambers 13*k* and 13*k*'' of the cylinders 13*d* and 13*d*' compresses resiliently and the tip of each of the rollers 13*i* and 13*i*' rolls over and passes through the mountain-like projection portions 13*g* and 13*g*' instantaneously in a state in which it is entered into the cylinders 13*d* and 13*d*', respectively, the oil in the oil chambers 13*b* and 13*b*' is withdrawn from the check valve 13*f*, as the respective tip of the rollers 13*i* and 13*i*' biased by the coiled spring 13*h* is allowed to abut with the peripheral wall surface of the liner 13*a*. Past the positions (8) and (9) as shown in FIG. 6, the rollers 13*i* and 13*i*' are accelerated by rolling or sliding while in abutment with the peripheral wall surface of the liner 13*a*, and returned to the start position (1).

In other words, for the oil pulse wrench 10, two rollers 13*i* and 13*i*', disposed in a relationship symmetrical by 180° to each other through the projection portions 13*g* and 13*g*' of the anvil shaft 13*c*, respectively, are hit at the positions (5) and (6) between which the liner 13*a* rotates once. Therefore, the socket 12 connected to the anvil shaft 13*c* can be rotated without an addition of any special mechanism for hitting once at one rotation of the liner by means of such a couple of instantaneous force. The resulting oil pulse wrench according to this embodiment can transmit the hitting force by the projection portions 13*g* and 13*g*' to the anvil shaft 13*c* in an effective way so that it has a good long-term durability and maintenance performance as well as a favorable economy.

EXAMPLE 2

Figure 7:
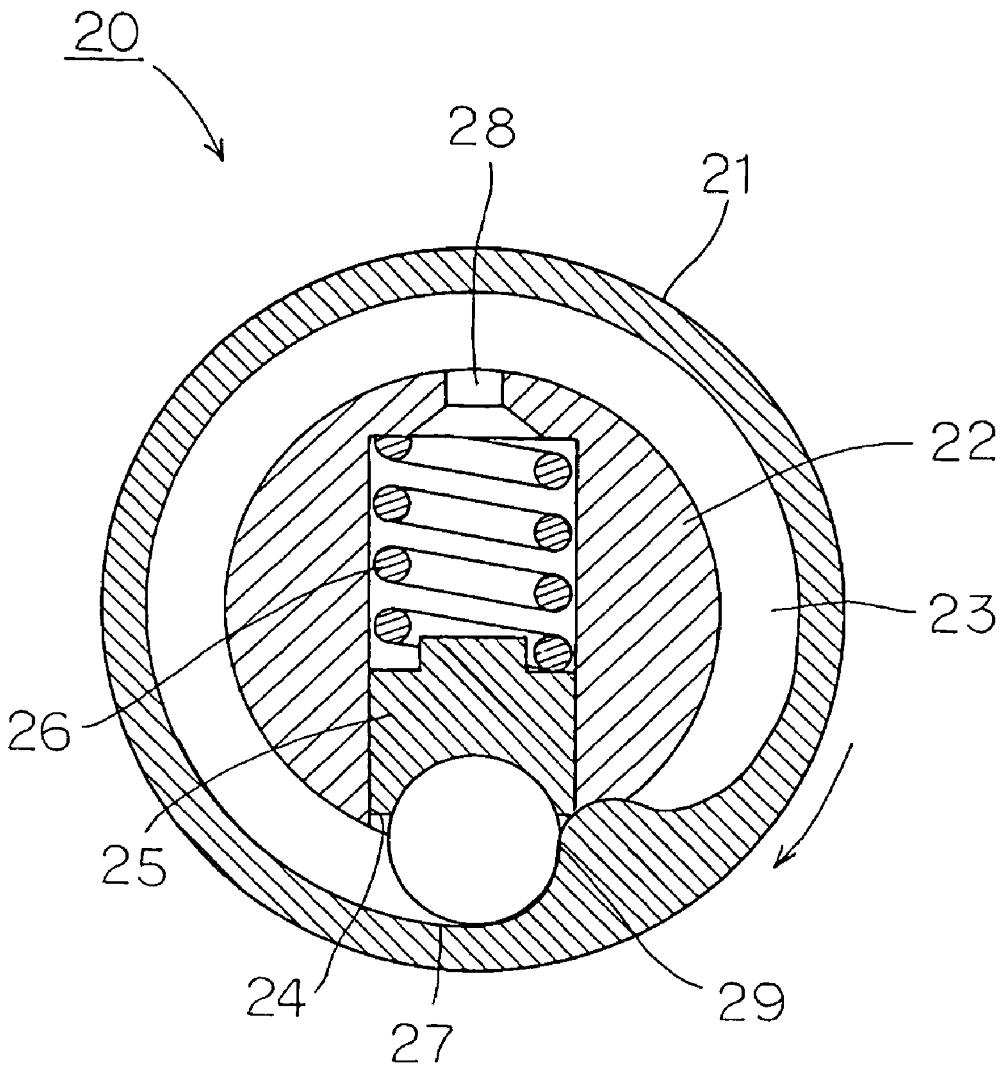
FIG. 7 is an elevation in section showing the rotatively hitting mechanism of a fastening tool according to Example 2 of the present invention.

FIG. 7 is an elevation in section showing the rotatively hitting mechanism of the fastening tool according to Example 2 of the present invention. In FIG. 7, reference numeral 20 stands for a rotatively hitting mechanism to be applicable to the impact wrench as an example of the fastening tool according to Example 2; reference numeral 21 for a liner rotatively coupled to the pneumatic motor 14; reference numeral 22 for an anvil shaft disposed rotatively in a lubricating oil chamber 23 of the liner 21; reference numeral 24 for a cylinder disposed in a direction crossing a rotary axle of the anvil shaft 22 at a right angle; reference numeral 25 for a piston engaged with and inserted into the cylinder 14 through an elastic member 26 disposed at the bottom portion thereof, biased in a direction perpendicularly to the rotary axle, and mounted slidably on the cylinder 24; reference numeral 27 for a rolling member in the form of a roller or a ball, which is held by the tip of the piston 25 and rolls while being pressed onto the inner wall surface of the liner 21; reference numeral 28 for an oil passage communicating the cylinder 24 with the lubricating oil chamber 23; and reference numeral 29 for a projection portion protruding or swelling in a mountain-like shape on the inner wall surface of the liner 21, which adds a hitting force to the anvil shaft 22 by rolling and hitting with the rolling member 27 held by the piston 25.

It is to be noted herein that reference numerals provided for the fastening tool according to Example 2 are the same as those provided for the fastening tool according to Example 1 with the exception that the rotatively hitting mechanism 20 is different from the fastening tool 10 of Example 1 and that the same elements having like functions are provided with the identical reference numerals in order to omit duplicate detailed explanation for brevity of description.

The fastening tool according to Example 2 is provided with a plurality of rotatively hitting mechanisms 20 concentrically with each other and at plural stages in such a manner that the positions of the projection portions 29 are disposed in a symmetrical relationship and further the cylinders 24 are disposed in identically axial directions so as to effectively generate a couple of forces at the time when the rolling members 27 rotatively hit the respective projection portions 29.

The impact wrench according to Example 2 has the structure in which the check valve part is omitted from the rotatively hitting mechanism of the oil pulse wrench 10 according to Example 1, so that it can be applied extensively to a variety of conventional fastening tools.

The inside of the cylinder 24 is provided with an elastic member 26, and the elastic member 26 can cause the piston 25 and the rolling member 27 to abut with the inner wall surface of the liner 21 due to the outwardly expanding force of the elastic member 26. The liner 21 is driven by a motor and hits the projection portion 29 disposed on the inner periphery of the liner. This structure allows the piston 25 to be hit once at every rotation of the liner 21, and adjustments for fastening or unfastening bolts and nuts to be mounted on an anvil of the anvil shaft 22 can be carried out with efficiency and readiness.

There are some occasions where mechanisms for generating a couple of forces and hitting once at every rotation are required for conventional impact wrenches having a structure in which the liner is not filled with oil. In this case, the rotatively hitting mechanism 20 according to Example 2 can also be applied to such conventional impact wrenches, thereby capable of generating a couple of forces effectively and adding the mechanism for hitting once at every one rotation. The resulting fastening tool is also favorable in an oil lubricating mechanism and versatile in applicability.

As described above, the fastening tool according to Example 2 is comprised of the rotatively hitting mechanism having a simple structure in which the projection portion is provided at one position on the inner wall surface of the liner in one cycle of rotation, and the hitting can be carried out once for sure at every one rotation of the liner. This structure is superior in a long-term durability, maintenance performance, and economical performance. Further, this embodiment can also be applied to the fastening tool of an oil lubricating system and a type capable of generating a couple of forces.

With the structure in the manner as described above, the fastening tool equipped with the rotatively hitting mechanism 20 can meet conditions required for either of the oil lubricating sytem and the type generating a couple of forces. For this fastening tool, the projection portion 29 is provided at one position on the rotational circumference of the liner, and the rotative hitting is carried out at the projection portion 29 protruding or swelling on the inner wall surface of the liner 21. This structure allows the projection portion 29 to effectively play two roles as a role for hitting on the one hand and as a role for a cam for hitting once at one rotation on the other. Further, the projection portions can be disposed in plural numbers concentrically to each other and at plural stages, while a half is disposed in a relationship symmetrical by 180° to each other so as to generate a couple of forces, thereby making the structure of the fastening tool very simple but making performance highly efficient.

The fastening tool of this type according to the present invention is easy in handling and in maintenance because it is of the type filling only the liner with oil, making filling the liner with oil and closing the liner ready, and less in oil shortage, as compared with conventional impact wrenches of an oil lubricating type or a grease lubricating type.

EXAMPLE 3

Figure 8:
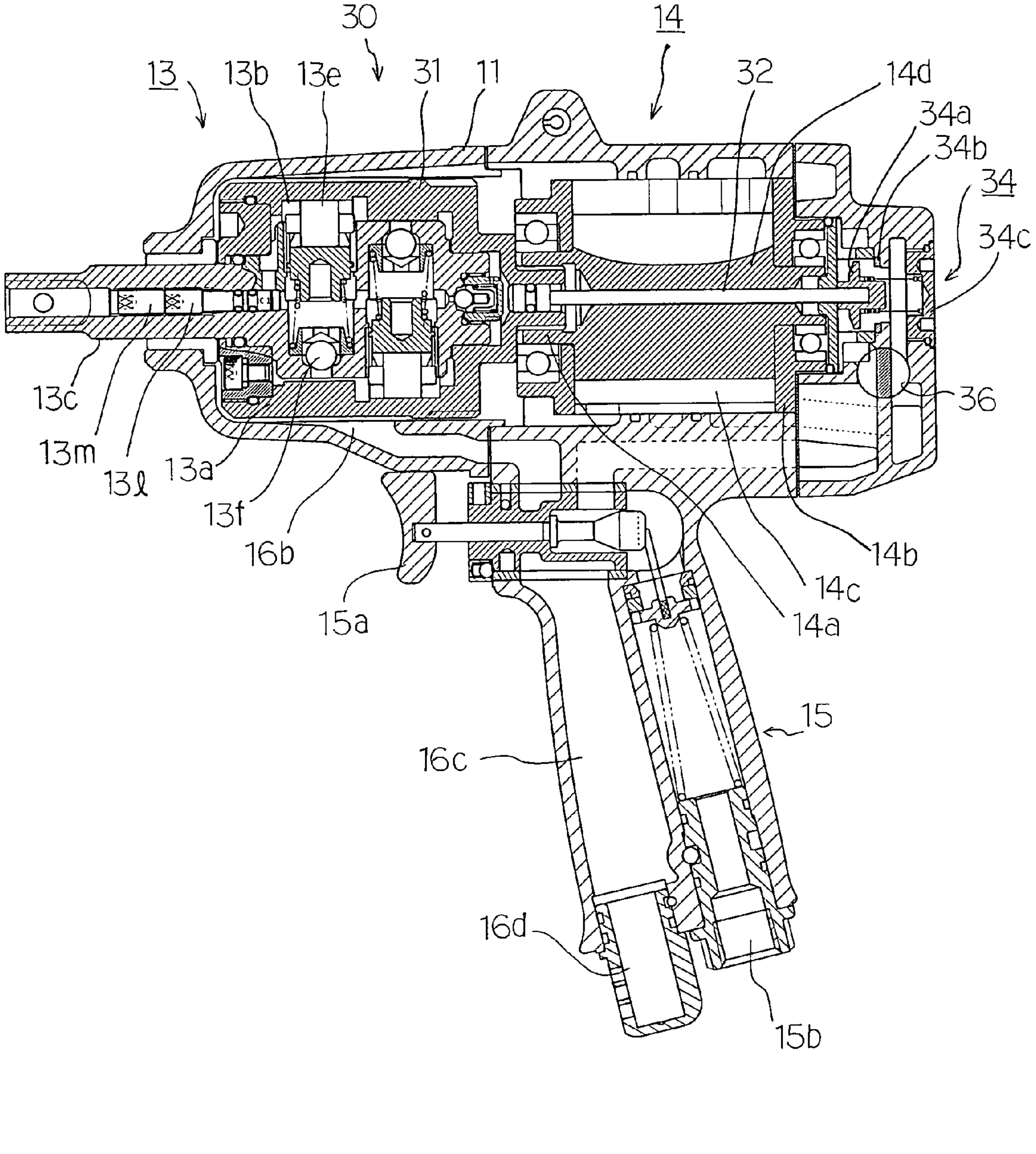
FIG. 8 is an elevation in section showing a fastening tool according to Example 3 of the present invention.
Figure 9:
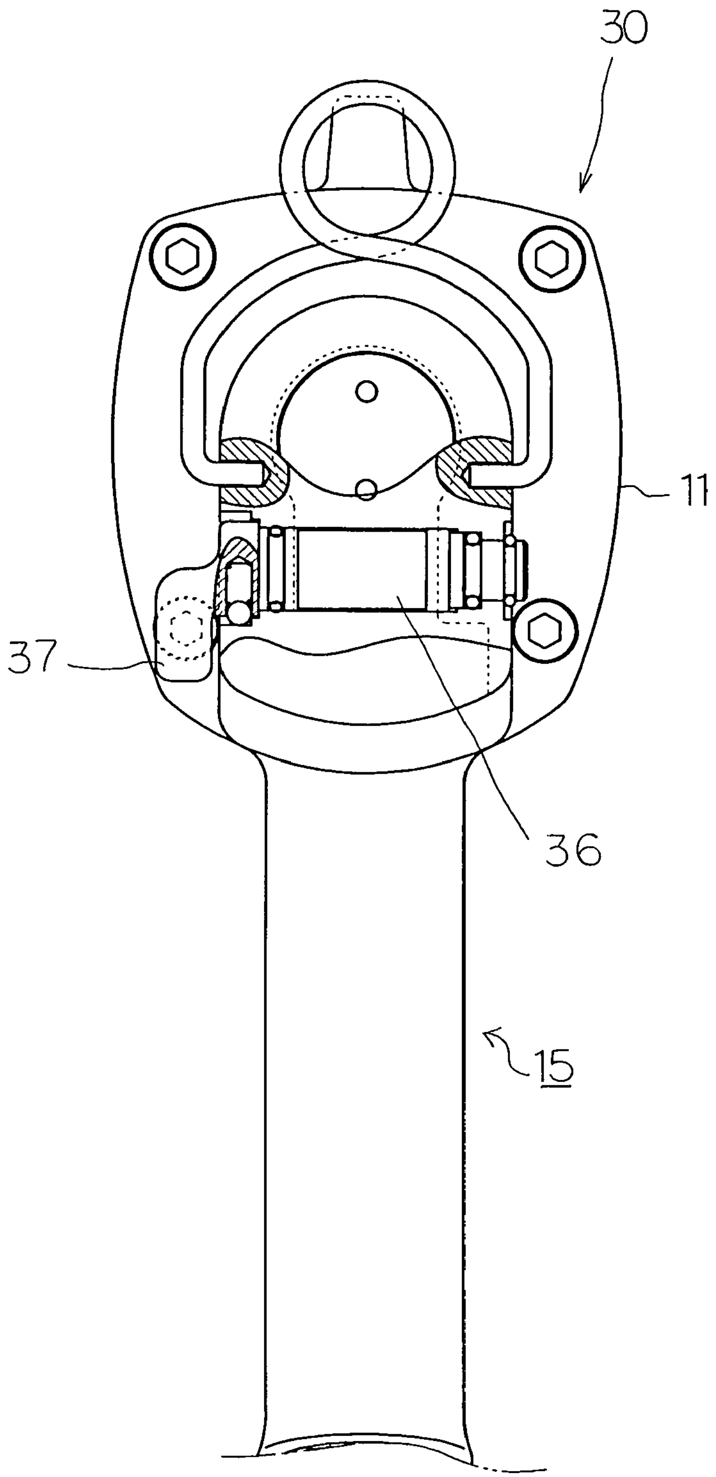
FIG. 9 is a side view showing the fastening tool of FIG. 8.

FIG. 8 is an elevation in section showing a fastening tool according to Example 3 of the present invention, and FIG. 9 is a side view showing the fastening tool. In FIGS. 8 and 9, reference numeral 30 stands for a fastening tool of Example 3; reference numeral 31 for a pressure decreasing unit of the rotatively hitting mechanism 13, disposed communicating with an oil chamber inside the liner with an operating oil filled therein; reference numeral 32 for a rod portion disposed communicating with an axial core position of the pneumatic motor 14 driven by a hydraulic force of oil passing through the pressure-decreasing unit 31; reference numeral 33 for a shut-off valve for blocking a supply of high pressure air to the pneumatic motor 14, operatively coupled to the rod portion 32; reference numeral 34 for a pressure setting means for adding a predetermined pressing force, which is adjustably provided with an elastic means such as a coiled spring or the like at the rear end of the rod portion 32; and reference numeral 36 for an air passage switching valve equipped with a changeover lever 37 for switching a torque control passage and a non-torque control passage, the torque control passage being disposed so as to supply high pressure air to the pneumatic motor 14 via a shut-off mechanism including the pressure decreasing unit 31, the rot portion 32, the pressure setting means 34, and so on, and the non-torque control passage being disposed so as to supply the high pressure air to the pneumatic motor 14 by bypassing the shut-off mechanism. In addition, reference numeral 131 stands for a relief valve for withdrawing oil in the liner reaching the set pressure in the rotatively hitting mechanism 13 to a bypass passage, although not shown, and reference numeral 13*m* stands for a lock screw for fixing an adjusting pin for defining the set pressure of the relief valve 131.

It is to be noted herein that the fastening tool 30 according to Example 3 is the one in which the shut-off mechanism for controlling the driving of the rotatively hitting mechanism is added to the oil pulse wrench 10 according to Example 1 and the other elements are substantially the same as the oil pulse wrench 10 of Example 1. Further, elements having substantially the same functions are provided with the identical reference numerals and symbols for brevity of explanation.

Figure 10:
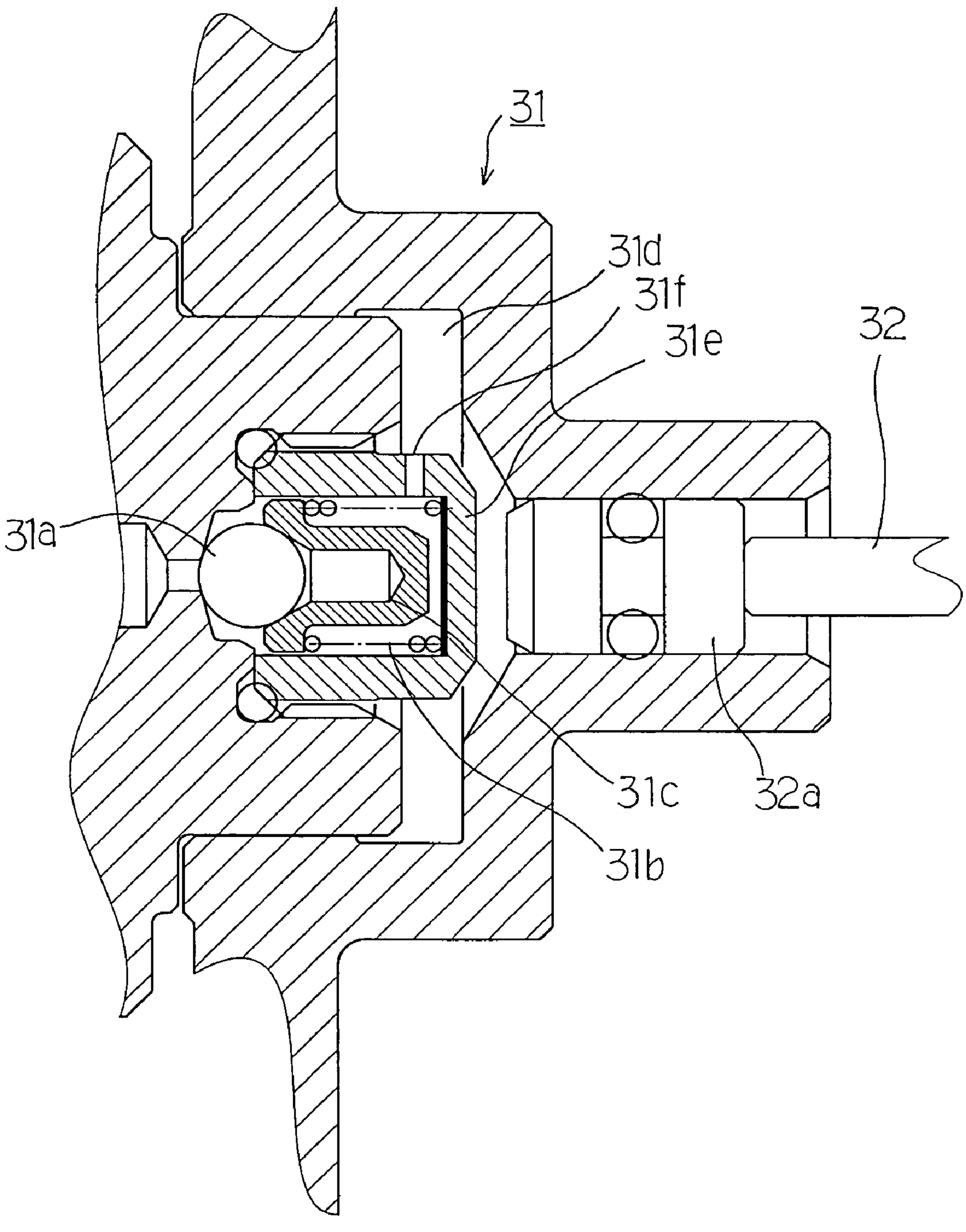
FIG. 10 is an enlarged view showing a pressure decreasing unit in the fastening tool of FIG. 8.
Figure 11:
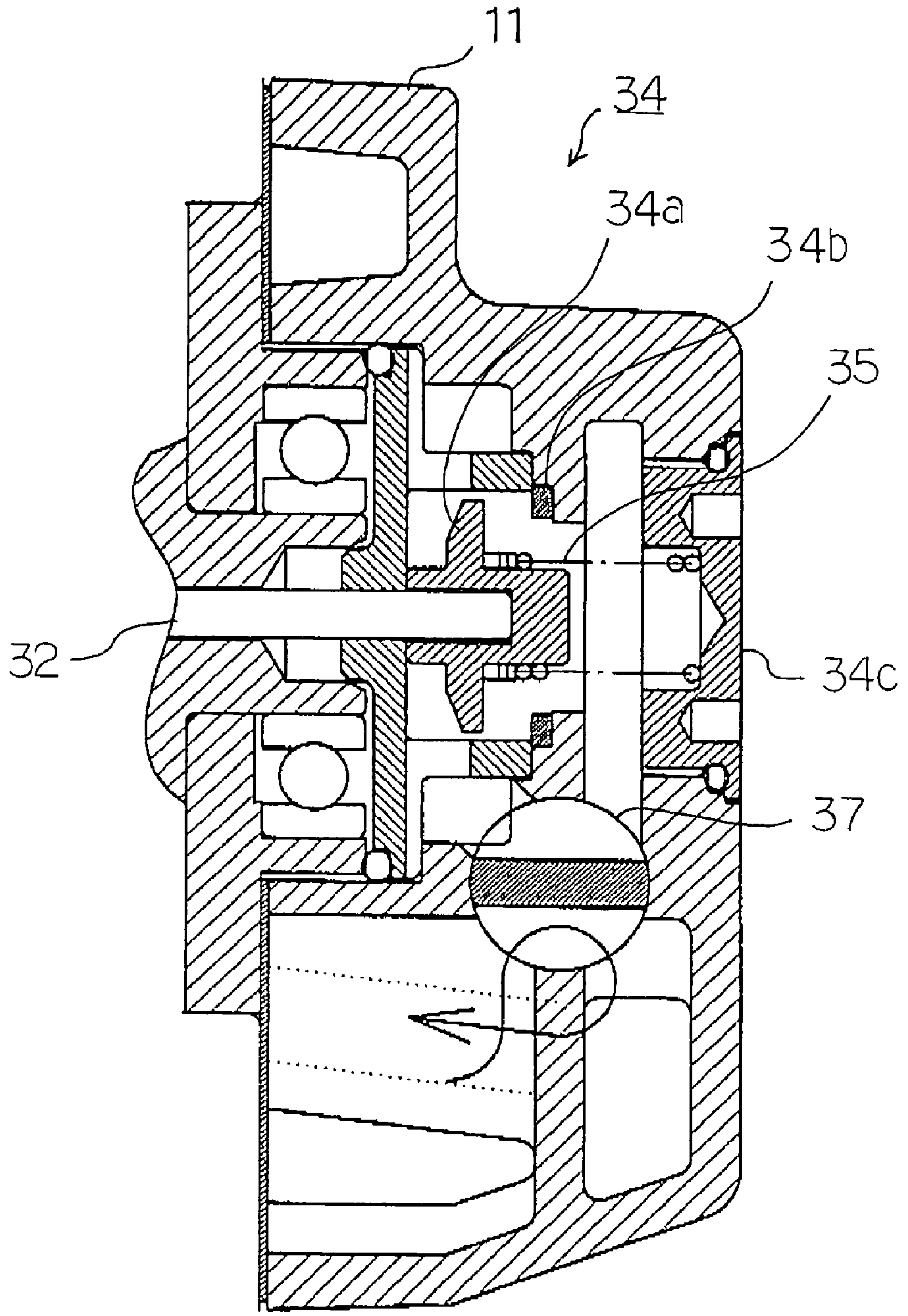
FIG. 11 is a partially enlarged view showing a shut-off mechanism in the fastening tool of FIG. 8.

As shown in a partially enlarged view of FIGS. 10 and 11, the shut-off mechanism for the fastening tool 30 is composed of and includes the pressure decreasing unit 31, the rod portion 32 driven in the axial direction of the pressure decreasing unit, and the pressure setting means 34 for adjustably adding a resilient force generated by the elastic member 35 to the rod portion 32.

The pressure decreasing unit 31 has a valve seat 31*c* biased by a ball valve 31*a* capable of being opened by the hydraulic force of the operating oil filled in the liner of the rotatively hitting mechanism 13 and the coiled spring 31*b*. The upper limit of impulse wave, which has been generated intermittently within the liner by the rotatively hitting mechanism 13, is cut off by the ball valve 31*a* and the coiled spring 31*b* to a given value or less and then the operating oil has the direction of the impulse wave shifted to a direction at a right angle with an orifice 31*f* disposed in a pressure decreasing box 31*e* of the pressure decreasing unit 31, and the operating oil is then supplied to an oil chamber 31*d*. Further, the piston 32*a* is pressed by the operating oil and smoothly drives the rod portion 32 in the axial direction.

As shown in FIG. 11, the pressure setting means 34 comprises a valve part 34*a* mounted on the rear end of the rod portion 32, a valve seat part 34*b* engaged with the valve part 34*a*, and an elastic member receiving part 34*c* to be mounted detachably through a screw or the like, formed in the form of a lid at the rear portion of the main body casing 11, by holding the elastic member 35 imparting a predetermined resilient force to the side of the valve part 34*a* detachably or the length of the spring adjustably.

Figure 12:
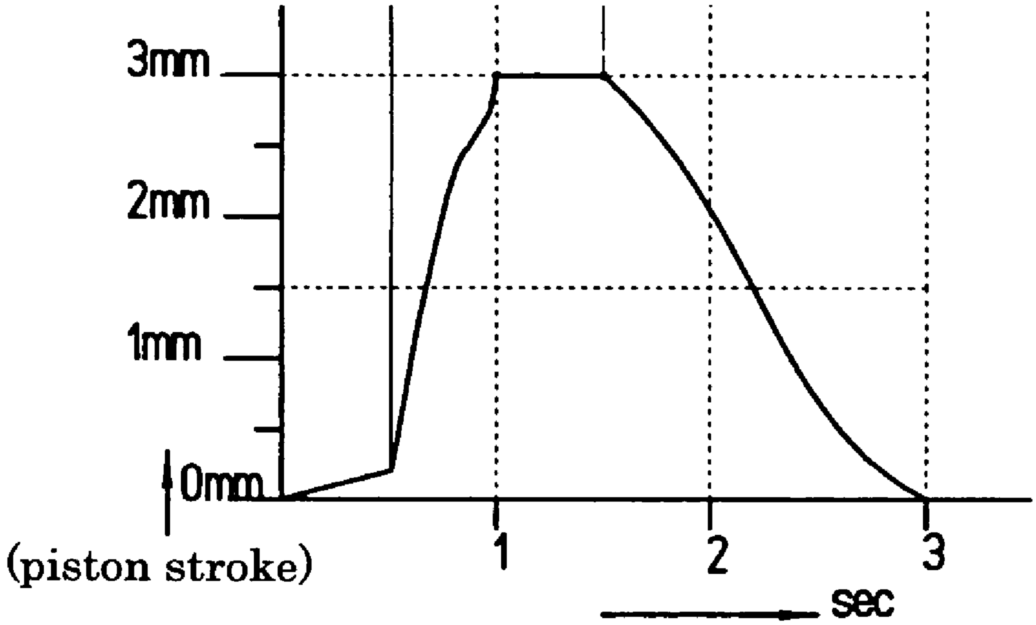
FIG. 12 is a shut-off diagram showing a variation in piston strokes with time.

FIG. 12 is the shut-off diagram showing a periodical variation of piston strokes of the piston 32*a* with time, the piston being pushed out by the operating oil. As shown in FIG. 12, as the operating oil inside the liner in the rotatively hitting mechanism 13 is injected into the oil chamber 31*d* through the pressure decreasing unit 31, the piston 32*a* is transferred slowly until a bolt or a nut is allowed to be seated immediately after the start. After the bolt or the nut has been seated, the piston 32*a* is further transferred up to the stroke end of the piston 32*a*. Then, while this state is being stayed intact, the supply of the high pressure air to the pneumatic motor 14 is blocked in a state in which the air supply lever 15*a* has been pulled and the shut-off state is maintained. The time required for reaching this shut-off state is arranged so as to be determined by the set load adjusted by the elastic member 35. The piston 32*a* is pulled back and reset to its original position through the rod portion 32 by means of the resilient force of the elastic member 35 of the pressure setting means 34. It is to be noted herein that the operating oil inside the oil chamber 31*d* in the returning step of the piston 32*a* is returned to the inside of the liner through an oil flow passage, although not shown.

As further shown in FIG. 12, the air passage switching valve 36 is disposed in such a manner that the state of the torque control passage as shown in FIG. 8 and the state of the non-torque control passage as shown in FIG. 11 are switched by the pivotal movement of the changeover lever 37 at approximately 90°, disposed in the rear portion of the main body casing 11. With this structure, for example, in the case where operations causing generating no high torque are to be conducted, operations for mounting or disassembling bolts, nuts or the like on or from apparatuses in a state in which the shut-off mechanism is set void can be carried out in an efficient way. In other words, as the air passage switching valve 36 is set at the erect position as shown in FIG. 8, the torque control passage can be formed through which the high pressure air for driving the pneumatic motor 14 flows via the pressure setting means 34. Further, for example, as the air passage switching valve 36 is rotated at 90° as shown in FIG. 11, the non-torque control passage is formed so as to supply the high pressure air to the pneumatic motor 14 by bypassing the pressure setting means 34.

As the fastening tool 30 according to Example 3 is configured in the manner as described above and provided with the shut-off mechanism in addition to the action provided for the fastening tool according to Example 1, an addition of an excessive torque to bolts, nuts, etc. to be mounted on the anvil can be prevented, thereby improving durability and operability. Moreover, this arrangement for the fastening tool 30 can effectively control a useless consumption of high pressure air for driving the pneumatic motor 14. Further, the fastening tool 30 is provided with the pressure setting means 34 that can add a predetermined pressing force by adjustably mounting the elastic member 35 at the rear end of the rod portion 32 operatively coupled with the shut-off valve 33 for blocking the supply of high pressure air to the pneumatic motor 14. Therefore, for example, an adjustment or setting of a threshold value for operating the pressure decreasing unit 31 and the shut-off valve 33 in the shut-off mechanism can be carried out with ease. The fastening tool of this type can also adjust the resilient force or exchange the elastic member 35 with readiness merely by detaching the elastic member receiving part 34*c* disposed at the rear portion of the main body casing 11 or mounting or detaching a washer to the elastic member 35.

In addition, the fastening tool 30 is provided with the air passage switching valve 36 for switching the torque control passage for supplying the pneumatic motor with high pressure air via the shut-off mechanism and the non-torque control passage for supplying the pneumatic motor with high pressure air by bypassing the shut-off mechanism. Therefore, the fastening tool 30 can be handled very easily because operations can be carried out because the shut-off mechanism can be rendered void merely by turning the changeover lever 37 in the case where the shut-off mechanism is not required.

EFFECTS OF THE INVENTION

As the fastening tool according to an embodiment of the present invention may be configured in such a manner that oil filled in the liner can be flown into the cylinder holding the piston through the oil passage, there can be provided the rotatively hitting mechanism (the oil pulse generating mechanism) for generating oil pulse or the like, which is superior in transmitting the impact torque with high efficiency upon pressing or hitting the projection portion (the hitting portion) disposed on the inner wall surface of the liner onto the rolling member (the portion to be hit), has a good lubrication performance among parts, and is low in noises. As a result, the fastening tool according to the present invention has a high durability, maintenance performance, and economy.

For the fastening tool according to another embodiment of the present invention, the rolling member can be effectively pressed onto the projection portion formed on the inner wall surface of the liner because the oil in the cylinder with the piston engaged therewith is held in a closed state with the check valve and it can suppress the entry of the rolling member and the piston at the time when the projection portion formed swelling on the inner side of the inner wall surface of the liner is pressed onto or hit with the rolling member held with the piston. Further, after the rolling member rolls over and passes through the projection portion of the liner, the oil outside the anvil shaft is supplied to the inside of the cylinder through the check valve to allow rotating the rolling member in such a state in which the tip of the rolling member is extended. This structure ensures a secure support of the rolling member and an effective transmission of the impact force to the anvil.

The fastening tool according to a further embodiment of the present invention may be provided with a plurality of the rotatively hitting mechanisms in a rotationally symmetrical relationship to add a moment of a couple of forces to the rotary axle of the anvil and realize a cam mechanism for hitting once at one rotation without a complicated structure. Therefore, the fastening tool can improve a hitting efficiency and be made compact in size as well as maintain a stably hitting state while minimizing drawbacks such as vibration, noises and so on which may be caused to occur at the rotating part.

The fastening tool according to a further embodiment of the present invention can ensure a stably hitting performance by preventing a rise in temperature of the rotatively hitting mechanism which may exert greatly adverse influences on a precision of torque. Therefore, the fastening tool according to the present invention can solve problems with limitations to use conditions as demonstrated in conventional oil pulse structures, which may be caused by a variation in a precision of output, etc. due to a variation in a locking phenomenon resulting from a thermal expansion of oil, changes of oil characteristics by a variation in temperature, and so on.

As the fastening tool according to a still further embodiment of the present invention may be provided with the pneumatic motor equipped with the shut-off mechanism for blocking the supply of high pressure air, an addition of an excessive load can be prevented during operations for fastening, or otherwise disposing of, bolts, nuts, etc., to be mounted on the anvil, and a useless consumption of high pressure air can be suppressed. Further, the elastic member can be disposed adjustably in the rod portion of the shut-off mechanism, and a predetermined pressing force can be added. Moreover, the adjustment and setting of the threshold value, etc. for opening the valve part of the shut-off mechanism can be conducted with ease by the aid of the rod portion, so that the fastening tool according to the present invention is superior in workability and operability as well as it has a simple device construction. It is advantageous in terms of costs and maintenance.

The fastening tool according to a still further embodiment of the present invention may be provided with the air passage switching valve for switching the torque control passage and the non-torque control passage, the torque control passage being for supplying the pneumatic motor with high pressure air via the shut-off mechanism and the non-torque control passage being for supplying the pneumatic motor with high pressure air through a bypass of the shut-off mechanism. Therefore, in the case where work is to be done without necessity of the shut-off mechanism, the fastening tool can also be used as the oil pulse wrench or the impact wrench, etc., each having an ease of handling, while the shut-off mechanism is rendered void.

What is claimed is:

1. A fastening tool having a rotatively hitting mechanism, comprising:

a generally cylindrically shaped liner filled with oil and connecting rotatively to a drive mechanism;

a projection portion disposed on an inner wall surface of said liner;

an anvil shaft disposed rotatively and coaxially within said liner;

a cylindrical bore disposed within said anvil shaft and crossing a rotary axis of said anvil shaft;

a piston slidably engaged within said cylinder;

an oil passage connecting said inside of said cylinder with an outside of said anvil shaft; and a rolling member disposed at a top end of said piston so as to roll along an inner wall surface of said liner;

elastic means for pressing said rolling member against said inner wall surface of said liner; and said rolling member pressing against both of said projection portion and said piston thereby raising pressure in said anvil cylindrical bore and defining a high pressure chamber disposed entirely in said anvil.

2. The fastening tool as claimed in claim 1, wherein said liner is disposed in such a manner that oil filled in said liner is arranged to flow through said oil passage in said cylinder within which holding said piston.

3. The fastening tool as claimed in claim 1, wherein said rolling member comes into collision with said projection portion formed in said liner.

4. The fastening tool as claimed in claim 1, wherein said rolling member is disposed to hit said projection portion once as said liner rotates once.

5. The fastening tool as claimed in claim 1, further comprising a check valve disposed in a based of said piston, said check valve directing oil from said oil passage in said liner into said cylinder.

6. The fastening tool as claimed in claim 1, wherein said rolling member is selected from a roller and a ball.

7. The fastening tool as claimed in claim 1, wherein said rotatively hitting mechanism is disposed in plural numbers coaxially with each other.

8. The fastening tool as claimed in claim 7, wherein said rotatively hitting mechanisms are disposed in a relationship rotationally symmetrical to each other.

9. The fastening tool as claimed in claim 7, wherein said rotatively hitting mechanisms are disposed in a in a relationship rotationally symmetrical by 180° to each other.

10. The fastening tool as claimed in claim 7, wherein two rotatively hitting mechanisms are disposed.

11. The fastening tool as claimed in claim 10, wherein said two rotatively hitting mechanisms are disposed in a relationship rotationally symmetrical to each other.

12. The fastening tool as claimed in claim 11, wherein said two rotatively hitting mechanisms are disposed in a relationship rotationally symmetrical by 180° to each other.

13. The fastening tool as claimed in claim 1, wherein said liner is rotated with said drive mechanism driven by air supplied to an exhaust passage disposed in said rotatively hitting mechanism to cool said rotatively hitting mechanism.

14. The fastening tool as claimed in claim 1, wherein said drive mechanism is provided with a shut-off mechanism for blocking a supply of high pressure air, and said shut-off mechanism comprises a pressure decreasing unit for adjusting a hydraulic pressure within said liner to a predetermined value, a rod portion disposed so as to be driven by a hydraulic pressure of oil passing through the pressure decreasing unit, and a shut-off valve arranged for opening or closing in association with said rod portion.

15. The fastening tool as claimed in claim 14, further comprising:

an air passage switching valve disposed in an air passage for supplying high pressure air to said drive mechanism; and said switching valve switching between a torque control passage and a non-torque control passage, said torque control passage supplying high pressure air to said drive mechanism through said shut-off mechanism and said non-torque control passage supplying high pressure air to said drive mechanism bypassing said shut-off mechanism.

16. The fastening tool as claimed in claim 1, wherein said drive mechanism is selected from a pneumatic motor and an electrically driven motor.

* * * * *